United States Patent Office 3,380,881
Patented Apr. 30, 1968

3,380,881
CURABLE COMPOSITIONS COMPRISING A POLY-EPOXIDE AND A GLYCOL POLYAMINE
Frank L. Williamson, South Plainfield, and Richard J. Burns, Somerville, N.J., assignors to Union Carbide Corporation, a corporation of New York
No Drawing. Continuation-in-part of application Ser. No. 132,577, Aug. 21, 1961. This application Nov. 20, 1963, Ser. No. 325,139
33 Claims. (Cl. 161—185)

ABSTRACT OF THE DISCLOSURE

This invention relates to a curable composition comprising a polyepoxide having an epoxy equivalency of greater than one and a glycol polyamine of the formula:

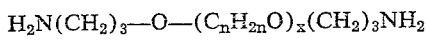

wherein $n$ is an integer having a value of 2 to 10 inclusive and $x$ is an integer having a value of 12 to 100 inclusive. The compositions of this invention can be used to bond implosion shields to curved surfaces of television picture tubes.

---

This application is a continuation-in-part of our copending application S.N. 132,577 filed Aug. 21, 1961, now U.S. Patent No. 3,306,809.

This invention relates to curable polyepoxide compositions and to cured products produced therefrom. More specifically, this invention relates to curable polyepoxide compositions which have particular utility for use as adhesive coatings characterized, on being cured, by excellent flexibility, excellent elongation and by excellent heat-aging properties.

Polyepoxide compositions usually contain curing agents which effect a cure of the compositions to infusible products, generally upon application of heat thereto. It has been found, however, that polyepoxide compositions containing conventional curing agents, such as m - phenylene diamine and hexahydrophthalic anhydride, upon being cured, are characterized by poor flexibility and by poor heat-aging properties. Consequently, presently known polyepoxide compositions have found limited use in applications wherein both excellent flexibility and excellent heat-aging properties are essential, as for example, as adhesive coatings for bonding implosion shields to television picture tubes. Conventional polyepoxide compositions, upon curing, do not possess sufficient flexibility to satisfactorily bond implosion shields to the curved surfaces of television picture tubes. Furthermore, such compositions, once cured, become increasingly rigid upon high temperature aging and readily delaminate from surfaces to which they have been applied.

The compositions of the present invention, upon being cured, have excellent flexibility, excellent elongation and excellent heat-aging properties. The compositions of this invention, therefore, can be advantageously used to bond implosion shields to curved surfaces of television picture tubes, as once cured, they possess such excellent heat-resistivity that they remain flexible and bonded thereto even upon being aged at relatively high temperature.

The compositions of this invention comprise a curable mixture of a polyepoxide having an epoxy equivalency of greater than one and a glycol polyamine of Formula I.

Formula I $$H_2N\text{-}(CH_2)_3\text{-}O\text{-}(C_nH_{2n}O)_x\text{-}(CH_2)_3NH_2$$

wherein $n$ has a value of from 2 to 10 inclusive, preferably from 2 to 5 inclusive; $x$ has a value of from 12 to 100 inclusive; preferably from 15 to 60 inclusive.

Compounds falling within the purview of Formula I can be conveniently prepared by cyanoalkylating a glycol having the formula:

Formula II $$HO\text{-}(C_nH_{2n}O)_x\text{-}H$$

wherein $n$ and $x$ are as previously defined, by reacting the glycol with at least 2 moles of acrylonitrile, per mole of glycol, at a temperature of from about 20° C. to about 60° C. in the presence of an alkali metal alkoxide, such as sodium methoxide, to form the corresponding cyanoalkylated compound. The cyanoalkylated compound is then hydrogenated at a temperature of from about 95° C. to about 100° C. in the presence of nickel, as a catalyst, and at pressures on the order of about 1500 p.s.i.g.

Suitable glycols which can be cyanoalkylated with acrylonitrile include, among others, poly(ethylene glycol), poly(diethylene glycol), poly(1,2 - propylene glycol), poly(1,3 - propylene glycol), poly(1,4 - butylene glycol) and the like. Illustrative of specific compounds falling within the scope of Formula I are the following: α,ω - di - (3 - aminopropyl)ether of a poly(ethylene glycol) which has an average molecular weight of about 1600, α,ω - di - (3 - aminopropyl)ether of poly(diethylene glycol) which has an average molecular weight of about 3000, α,ω - di - (3 - aminopropyl)ether of a poly (1,2 - propylene glycol) which has an average molecular weight of about 1025 and α,ω - di - (3 - aminopropyl) ether of a poly(1,2 - propylene glycol) which has an average molecular weight of about 2025.

Various amounts of the glycol polyamines can be used to cure the polyepoxides to infusible products. Generally, the glycol polyamines are used in amounts of from about 75 percent of stoichiometric to about 15 percent in excess of stoichiometric. Optimum properties in cured polyepoxide compositions are achieved using about stochiometric amounts of the glycol polyamines. For purposes of stoichiometric calculations, one epoxy group is deemed to react with one amino-hydrogen atom.

The polyepoxides which can be cured with the glycol polyamines are those organic compounds having an epoxy equivalency of greater than one, that is, compounds having an average of more than one epoxy group, i.e.,

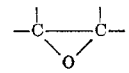

per molecule. These compounds, wherein the oxygen of the epoxy group is attached to vicinal carbon atoms, can be saturated or unsaturated, aliphatic, cycloaliphatic, or heterocyclic, and can be substituted, with substituents such as halogen atoms, alkyl groups, ether groups and the like.

In further explanation of the term "epoxy equivalency," this term generally refers to the average number of epoxy groups contained in the average polyepoxide molecule. This value is obtained by dividing the molecular weight of the polyepoxide by its calculated epoxy equivalent weight. The epoxy equivalent weight is usually determined by heating a one gram sample of the polyepoxide with an excess of pyridinium chloride which is dissolved in pyridine. The excess pyridinium chloride is then back-titrated with 0.1 N sodium hydroxide to an end point using phenolphthalein as the indicator. The epoxy equivalent weight is calculated by considering that one HCl molecule is equivalent to one epoxide group. If the polyepoxide is a single compound and all of its epoxy groups are intact, the epoxy equivalency values will be integers of whole numbers, such as 2, 3, 4 and the like. In those instances wherein the polyepoxide is a mixture of polyepoxides or contains some monomeric monoepoxides or where the polyepoxide has some of its epoxy groups hydrated or otherwise reacted, the epoxy equivalency values may contain fractions, such as 1.2, 1.5, 2.8 and the like.

Illustrative of polyepoxides which can be cured with the glycol polyamines are the polyglycidyl ethers of polyhydric phenols, exemplified by the polyglycidyl ethers of such phenols as the mononuclear polyhydric phenols, resorcinol and pyrogallol; the di- or polynuclear phenols, such as the bisphenols described in Bender et al., U.S. Patent 2,506,486 and polyphenylols such as the novolac condensation products of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Patent 2,855,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U.S. Patent 2,506,486). The polyhydric polynuclear phenols can consist of two or more phenols connected by such groups as methylene, alkylidene or sulfone. The connecting groups are further exemplified by bis-(p-hydroxyphenyl)methane, 2,2-bis-(p-hydroxyphenyl)propane and dihydroxydiphenyl sulfone.

Process for the preparation of polyglycidyl ethers of polyhydric phenols is described in detail in the Bender et al. patent (supra) and U.S. Patent 2,801,989 to A.G. Farnham.

Particularly desirable for purposes of this invention are the polyglycidyl ethers of the bis-(hydroxyphenyl) alkanes, as for example, the diglycidyl ether of 2,2-bis-(p-hydroxyphenyl)propane and the diglycidyl ether of bis-(p-hydroxylphenyl)methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Patent 2,898,349 to P. Zuppinger et al.)

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethylaniline, p-toluidine, m-chloroaniline, p-aminodiphenyl, m-phenylenediamine, p-phenylenediamine, 4,4'-diaminodiphenyl methane, or with amino phenols such as p-aminophenol, 5-amino-1-n-naphthol, 4-aminoresorcinol, 2-methyl-4-aminophenol, 2-chloro-4-aminophenol and the like. Specific compounds include, among others, N,N-diglycidylaniline, N,N-diglycidyl-2,6-dimethylaniline, N,N,N',N'-tetraglycidyl-4,4'-diaminodiphenyl methane, the triglycidyl derivative of p-aminophenol wherein the aminohydrogen and OH hydrogen atoms are replaced by glycidyl groups. Polyglycidyl derivatives of aromatic amines and amino phenols and methods for their preparation are further described in U.S. Patents 2,951,825 and 2,951,822 to N. H. Reinking and N. H. Reinking et al., respectively. The so-called peracetic acid epoxides which are obtained by epoxidation across a double bond, such as bis-(2,3-epoxycyclopentyl)ether, 3,4-epoxy-6-methylcyclohexylmethyl-3,4-epoxy-6-methyl-cyclohexane carboxylate, vinylcyclohexene dioxide, dicyclopentadiene dioxide and the like are also suitable.

It is to be understood that all patents and literature references referred to in this specification are incorporated herein by reference.

The polyepoxides and the glycol polyamines are combined by simply admixing the two together, generally at temperatures of about 40° C. to about 50° C. In those instances wherein the polyepoxides are relatively low viscosity liquids, they are admixed directly with the glycol polyamines. Polyepoxides which are too viscous for ready mixing with the glycol polyamines can be heated to reduce their viscosity or liquid diluents can be added thereto in order to provide the desired fluidity. Normally solid polyepoxides are either melted or mixed with liquid diluents.

Suitable solvents for imparting the desired fluidity to highly viscous or normally solid polyepoxides are ketones, such as acetone, methyl isobutyl ketone, isophorone and the like; esters, such as ethyl acetate, butyl acetate, ethylene glycol monoacetate, acetate of ethylene glycol monomethyl ether and the like; ether alcohols, such as the methyl, ethyl, and butyl ether of ethylene glycol or of diethylene glycol; chlorinated hydrocarbons, such as trichloropropane, chloroform and the like. Also suitable in admixture with the solvents noted are the aromatic hydrocarbons, such as benzene, toluene, xylene and the like; alcohols, such as ethyl alcohol, isopropyl alcohol, n-butyl alcohol and the like. The actual amount of solvent used will depend upon the polyepoxide being employed. If desired, rather than using solvents of the type described, or in addition thereto, reactive liquid diluents containing a single epoxy group:

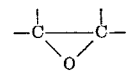

can be used in order to achieve the desired fluidity in the polyepoxides. Among such suitable reactive liquid diluents are butyl glycidyl ether, allyl glycidyl ether, phenyl glycidyl ether and the like. In determining stoichiometric amounts with respect to the glycol polyamines, the presence of "reactive" diluents is taken into account.

Additional materials such as fillers, pigments, fibers, dyes, plasticizers, peroxides such as benzoyl peroxide, accelerators such as triphenyl phosphite and the like can also be added to the compositions of this invention, if so desired.

Although the compositions of this invention will cure to infusible products having excellent flexibility, excellent elongation and excellent heat-aging properties without the necessity of adding other curing agents, it is customary to add thereto, in adidtion to the glycol polyamines, conventional hardeners, that is, compounds which themselves are reactive with polyepoxides. These hardeners serve the purpose of decreasing the time of the curing cycle. The time of the curing cycle in each instance will depend upon the exact composition and the temperature to which the composition is heated.

In addition, by varying the ratio of the amount of conventional hardener to the amount of glycol polyamine in the polyepoxide compositions, properties such as flexibility and tensile strength, can be varied over a wide range.

When used, the hardener is present in amounts such that the total amount of hardener and glycol polyamine present in the compositions is from about 75 percent of stoichiometric to about 15 percent in excess of stoichiometric with the glycol polyamine being present in at least about 5 and preferably about 20 percent of stoichiometric.

Illustrative of suitable hardeners are those compounds containing replaceable hydrogen atoms, as for example, the polyamines having the formula:

Formula III

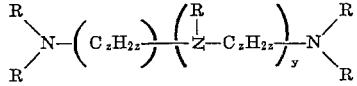

wherein $y$ is an integer from zero to 3 inclusive, $z$ is an integer from 2 to 6 inclusive, R in each instance is a monovalent substituent being either hydrogen or a hydroxyalkyl group wherein the alkyl group preferably contains from 1 to 4 carbon atoms inclusive, as for example, hydroxyethyl and hydroxypropyl, the hydroxyalkyl groups in any molecule not necessarily being the same, and the number of instances per molecule where R represents a hydroxyalkyl group being a whole number which is at least one, but less than $y+2$.

Typical hydroxyalkyl alkylene polyamines coming within the scope of the above structural formula are the following: N-hydroxyethyl ethylene diamine, N-hydroxyethyl pentamethylene diamine, N-hydroxypropyl tetramethylene diamine, N-hydroxyethyl diethylene triamine, N,N-dihydroxyethyl diethylene triamine, N,N''-dihydroxyethyl diethylene triamine, N-hydroxypropyl diethylene triamine, N,N-dihydroxypropyl diethylene triamine, N,N''-dihydroxypropyl diethylene triamine, N-hydroxyethyl propylene diamine, N-hydroxypropyl propylene diamine, N-hydroxyethyl dipropylene triamine, N,N-dihydroxyethyl dipropylene triamine, N,N'-dihydroxyethyl dipropylene triamine, tris-hydroxyethyl triethylene tetramine and the like.

Preparation of hydroxyalkyl alkylene polyamines is described in U.S. Patent 2,901,461 to V. Auerbach et al.

Other suitable polyamine hardeners include, among others, the adducts formed on reacting at temperatures of about 0° C. to about 100° C. a polyamine having Formula III, previously noted, or a polyamine having the formula:

Formula IV

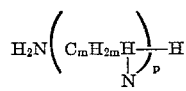

wherein $m$ has a value of from 2 to 10 inclusive, preferably from 2 to 6 inclusive and $p$ has a value of from 1 to 6 inclusive, preferably 1 to 4 inclusive; with at least about 0.33 mole and preferably from about 0.5 mole to about 1.0 mole, per mole of amine, of an acrylate having the formula:

Formula V

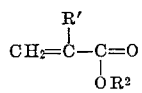

wherein $R^2$ is an alkyl radical, preferably containing from 1 to 18 carbon atoms inclusive; $R'$ is either hydrogen or alkyl having a maximum of 2 carbon atoms.

Among suitable polyamines falling within the scope of Formula IV are: 1,2-diaminoethane, 1,3-diaminopropane, 1,4-diaminobutane, 1,5-diaminopentane, 1,6-diaminohexane, 1,8-diaminooctane, 1,9-diaminononane, 1,10-diaminodecane, diethylenetriamine, triethylenetetramine, tetraethylenepentamine, dipropylenetriamine and the like. Illustrative of acrylates coming within the purview of Formula V which can be reacted with the polyamines to produce the amineacrylate adducts are the following: methylacrylate, ethylacrylate, n-propylacrylate, isopropylacrylate, n-butylacrylate, n-amylacrylate, n-hexylacrylate, 2-ethylhexylacrylate, n-octylacrylate, n-nonylacrylate, n-laurylacrylate, n-pentadecylacrylate, n-octadecylacrylate, methylmethacrylate, methylethacrylate, isopropylmethacrylate, n-hexylmethacrylate, n-nonylmethacrylate, ethylethacrylate n-propylethacrylate, n-butylethacrylate, n-amylethacrylate, n-hexylethacrylate, 2-ethylhexylethacrylate, n-octadecylethacrylate and the like.

In addition to the amines noted, other suitable amine hardening agents are: 2-aminoethanol, 2-aminopropanol, 3-aminobutanol, 1,3-diamino-2-propanol, m-aminophenol, p-aminophenol, 4,4'-methylenedianiline, m-phenylenediamine and the like.

Stoichiometry calculations with respect to the amines noted are based on replaceable hydrogen atoms.

Exemplary of other suitable hardening agents are the phenols, as for example, phenol, o-cresol, m-cresol, p-cresol, o-chlorophenol, m-chlorophenol, p-chlorophenol, p-bromophenol, 2,4,6-trichlorophenol, 2,4,6-tribromophenol, guaiacol, anol, eugenol, iso-eugenol, salígenin, carvacrol, thymol, o-hydroxyacetophenone, p-hydroxyacetophenone, p-hydroxydiphenyl, o-hydroxydiphenyl, o-cyclohexylphenol, p-cyclohexylphenol; polyhydric phenols such as catechol, hydroquinone, hydroxyhydroquinone, phloroglucinol, resorcinol and pyrogallol; the di- or poly-nuclear phenols such as the bisphenols described in Bender et al. U.S. Patent 2,506,486, and polyphenylols such as novolac condensates of a phenol and a saturated or unsaturated aldehyde containing an average of from 3 to 20 or more phenylol groups per molecule (cf. book by T. S. Carswell entitled Phenoplasts, published in 1947 by Interscience Publishers of New York). Examples of suitable polyphenylols derived from a phenol and an unsaturated aldehyde such as acrolein, are the triphenylols, pentaphenylols and heptaphenylols described in U.S. Patent 2,885,385 to A. G. Farnham.

The phenols may contain alkyl or aryl ring substituents or halogens, as exemplified by the alkyl resorcinols, the tribromoresorcinol and the diphenols containing alkyl and halogen substituents on the aromatic ring (Bender et al. U.S. Patent 2,506,486).

The polyhydric polynuclear phenols can consist of 2 or more phenols connected by such groups as methylene, alkylidene, ether, ketone or sulfone. The connecting groups are further exemplified by the following compounds: bis-(p-hydroxyphenyl)ether, bis-(p-hydroxyphenyl)sulfone, bis-(p-hydroxyphenyl)methane, bis-(p-hydroxyphenyl)propane.

For purposes of stoichiometric calculations with respect to phenols, one hydroxy group is deemed to react with one epoxy group.

In addition to the hardening agents previously listed, polycarboxylic acids and anhydrides thereof can also be employed. Among suitable carboxylic acids are those of the formula:

$$HOOC-(CH_2)_f-COOH$$

wherein $f$ is an integer having a value of from 0 to 10 inclusive, as for example, malonic, succinic, glutaric, adipic, pimelic, suberic, azelaic, sebacic acids and the like. Other examples of suitable acids are phthalic acid, isophthalic acid, nadic acid and the like, as well as the anhydrides of the acids noted above. Further acids which can be used as hardening agents are enumerated in U.S. Patent 2,918,444 to B. Phillips et al.

For purposes of stoichiometric calculations with respect to acids and anhydrides thereof, one carbonyl group is deemed to react with one epoxy group.

The examples which follow further illustrate the present invention and are not intended to limit the scope thereof in any manner.

Amounts noted in the examples are in parts by weight.

Values as to physical properties were determined according to the following test procedures:

Tensile strength _____ ASTMD 638–58T.
Percent elongation _____ ASTMD 638–58T.
Flexural strength _____ ASTMD 790–58T.
Izod impact _____ ASTMD 256–56.
Hardness _____ ASTMD 676 (A Scale),
ASTMD 1484 (D Scale).

Example 1

Compositions, whose formulations are noted below, were formulated by heating each component to 90° C. and then blending the preheated components together in a beaker for 2 minutes at room temperature. The compositions so formulated were cast into bars having the following dimensions: 8 inches by 1 inch by 0.25 inch. The bars were heated at 90° C. for 1 hour and at 160° C. for 6 hours. Physical properties of the compositions were determined using the bars so prepared in the tests which are also noted below.

|  | Composition | |
| --- | --- | --- |
|  | A | B |
| Diglycidyl ether of 2,2-bis-(p-hydroxyphenyl)propane | 100 | 100 |
| Hardener | 16 | 12 |
| Di-(3-aminopropyl)ether of poly(propylene glycol) | 64 | 128 |
| Tensile strength, p.s.i | 2,919 |  |
| Percent elongation | 24 | 52 |
| Hardness: |  |  |
| As prepared | [1] 62 | [2] 75 |
| Tested after being kept at 125° C. for one week | [1] 72 | [2] 78 |

[1] Shore D.
[2] Shore A.

The diglycidyl ether of 2,2 - bis - (p-hydroxyphenyl) propane noted in this and in subsequent examples had an epoxy equivalency of 2 and an epoxy equivalent weight of 190 grams per gram mole.

The hardener noted in this example was a mixture of 56.7 parts by weight m-phenylenediamine, 30.3 parts by weight 4,4'-methylenedianiline and 13.3 parts by weight of diglycidyl ether of 2,2-bis-(p-hydroxyphenyl)propane, identified in the preceding sentence.

The hardener was present in an amount of 80 percent of stoichiometric in Composition A and 60 percent of stoichiometric in Composition B.

The di-(3-aminopropyl)ether of poly(propylene glycol) noted in this example and in subsequent examples has the formula:

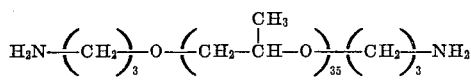

and was present in Composition A in an amount of 20 percent of stoichiometric and in Composition B in an amount of 40 percent of stoichiometric.

Example 1 was repeated using as the curing agent, in lieu of the hardener described and the di-(3-aminopropyl)ether of poly(propylene glycol), a stoichiometric amount of a compound having the formula:

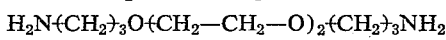

This composition was very rigid as determined by manually bending bars prepared from this composition.

Example 1 was also repeated using as the sole curing agent a stoichiometric amount of the hardener noted in Example 1. This composition was not flexible, as indicated by its percent elongation value of only 4.1 and by its 100 Shore D value (tested without being heat-aged).

Example 2

Compositions, whose formulations are noted below, were formulated, cast into bars and the bars subjected to a heating cycle, all as described in Example 1.

|  | Composition | |
| --- | --- | --- |
|  | C | D |
| Diglycidyl ether of 2,2-bis-(p-hydroxyphenyl) propane | 100 | 100 |
| m-Phenylenediamine | 11.6 | 8.7 |
| Di-(3-aminopropyl) ether of poly(propylene glycol) | 64 | 128 |
| Tensile strength, p.s.i | 2,742 |  |
| Percent elongation | 24 | 39 |
| Hardness: |  |  |
| As prepared | [1] 65 |  |
| Tested after being kept at 125° C. for one week | [1] 72 |  |

[1] Shore D.

Meta-phenylenediamine was present in Composition C in an amount of 80 percent of stoichiometric and in Composition D in an amount of 60 percent of stoichiometric.

Di-(3-aminopropyl)ether of poly(propylene glycol) was present in Composition C in an amount of 20 percent of stoichiometric and in Composition D in an amount of 40 percent of stoichiometric.

Example 2 was repeated using as the sole curing agent a stoichiometric amount of m-phenylenediamine. This composition was not flexible as indicated by a percent elongation value of only 3.1 and a Shore D value of 100 (tested without being heat-aged).

Example 3

Compositions, whose formulations are noted below, were formulated, cast into bars and the bars subjected to a heating cycle, all in a manner identical to that described in Example 1.

|  | Composition | |
| --- | --- | --- |
|  | E | F |
| Diglycidyl ether of 2,2-bis-(p-hydroxyphenyl)-propane | 100 | 100 |
| 4,4'-methylenedianiline | 22.4 | 16.8 |
| Di-(3-aminopropyl)ether of poly(propylene glycol) | 64 | 128 |
| Tensile strength, p.s.i | 2,857 |  |
| Percent elongation | 22 | 48 |
| Hardness: |  |  |
| As prepared | [1] 67 |  |
| Tested after being kept at 125° C. for one week | [1] 71 |  |

[1] Shore D.

4,4'-methylenedianiline was present in Composition E in an amount of 80 percent of stoichiometric and in Composition F in an amount of 60 percent of stoichiometric.

Di-(3-aminopropyl)ether of poly(propylene glycol) was present in Composition E in an amount of 20 percent of stoichiometric and in Composition F in an amount of 40 percent of stoichiometric.

Example 4

Compositions, whose formulations are noted below, were formulated and cast into bars in a manner identical to that described in Example 1. The bars were subjected to the following heating cycle: 5 hours at 100° C., 1 hour at 160° C. and then 6 hours at 200° C.

|  | Composition G |
| --- | --- |
| Diglycidyl ether of 2,2 - bis - (p - hydroxyphenyl)-propane | 100 |
| Hexahydrophthalic anhydride | 64 |
| Di - (3 - aminopropyl)ether of poly(propylene glycol) | 64 |
| Tensile strength p.s.i | 2012 |
| Percent elongation | 45 |
| Hardness: |  |
| As prepared | 58 Shore D |
| Tested after being kept at 125° C. for one week | 64 Shore D |

Hexahydrophthalic anhydride was present in Composition G in an amount of 80 percent of stoichiometric. Di-(3-aminopropyl)ether of poly(propylene glycol) was present in Composition G in an amount of 20 percent of stoichiometric.

Example 4 was repeated using as the sole curing agent a stoichiometric amount of hexahydrophthalic anhydride. This composition was not flexible as indicated by a 100 Shore D value (tested without being heat-aged) and by the fact that it was too brittle to test for percent elongation.

Example 5

Compositions, whose formulations are noted below, were formulated and cast into bars in a manner identical to that described in Example 1. The bars were subjected to the following heating cycle: 16 hours at 90° C., 1 hour at 160° C. and then 6 hours at 200° C.

|  | Composition | |
|---|---|---|
|  | H | I |
| Diglycidyl ether of 2,2-bis-(p-hydroxyphenyl) propane | 100 | 100 |
| Methyl nadic anhydride | 74.5 | 55.8 |
| Di-(3-aminopropyl)ether of poly(propylene glycol) | 64 | 128 |
| Tensile strength, p.s.i. | 1,596 | 2,222 |
| Percent elongation | 43 | 27 |
| Hardness: |  |  |
| As prepared | [1] 47 | [1] 61 |
| Tested after being kept at 125° C. for one week | [1] 69 | [1] 73 |

[1] Shore D.

Methyl nadic anhydride (methyl-bicyclo-2,2,1)hept-5-ene-2,3-dicarboxylic anhydride was present in Composition H in an amount of 80 percent of stoichiometric and in Composition I in an amount of 60 percent of stoichiometric.

Di-(3-aminopropyl)ether of poly(propylene glycol) was present in Composition H in an amount of 80 percent of stoichiometric and in Composition I in an amount of 40 percent of stoichiometric.

Example 5 was repeated using as the sole curing agent a stoichiometric amount of methyl nadic anhydride. This composition was not flexible as indicated by a 100 Shore D value (tested without being heat-aged) and by the fact that it was too brittle to test for percent elongation.

Example 6

Compositions, whose formulations are noted below, were formulated and cast into bars in a manner identical to that described in Example 1. The bars were subjected to the following heating cycle: 15 minutes at 110° C., and then 4 hours at 160° C.

|  | Composition | |
|---|---|---|
|  | J | K |
| Diglycidyl ether of 2,2-bis-(4-hydroxyphenyl)propane | 100 | 100 |
| Novolac resin | 44 | 33 |
| Di-(3-aminopropyl)ether of poly(propylene glycol) | 64 | 128 |
| Tensile strength | 1,510 |  |
| Percent Elongation | 291 | 148 |
| Hardness: |  |  |
| As prepared | [1] 63 | [2] 32 |
| Tested after being kept at 125° C. for one week | [1] 65 | [2] 61 |

[1] Shore D.
[2] Shore A.

Di-(3-aminopropyl)ether of poly(propylene glycol) was present in Composition K in an amount of 20 percent of stoichiometric and in Composition L in an amount of 40 percent of stoichiometric.

The novolac resin was present in Composition K in an amount of 80 percent of stoichiometric and in Composition L in an amount of 60 percent of stoichiometric.

The novolac resin was produced by charging a still with:

| Phenol | 949 |
|---|---|
| Formalin | 126.5 |
| Zinc oxide | 3.2 | and heating the contents of the still first to reflux (113° C.–115° C.) for 2.5 hours, then to 160° C. allowing water to distill off. The contents of the still were held at 160° C. for 30 minutes after which time a vacuum of 50 mm. of Hg was applied and the mass in the still steam distilled.

Example 7

Compositions, whose formulations are noted below, were formulated and cast into bars in a manner identical to that described in Example 1. The bars so cast were subjected to the following heating cycle: 15 minutes at 110° C. and then 4 hours at 160° C.

|  | Composition | |
|---|---|---|
|  | L | M |
| Diglycidyl ether of 2,2-bis-(p-hydroxylphenyl)propane | 100 | 100 |
| Novolac resin | 44 | 33 |
| Di-(3-aminopropyl)ether of poly(propylene glycol) | 64 | 128 |
| Tensile strength, p.s.i. | 2,481 |  |
| Percent elongation | 38 | 47 |
| Hardness: |  |  |
| As prepared | [1] 58 |  |
| Tested after being held at 125° C. for one week | [1] 65 |  |

[1] Shore D.

Di-(3-aminopropyl)ether of poly(propylene glycol) was present in Composition L in an amount of 20 percent of stoichiometric and in Composition M in an amount of 60 percent of stoichiometric.

The novolac resin was present in Composition L in an amount of 80 percent of stoichiometric and in Composition M in an amount of 60 percent of stoichiometric.

The novolac resin was prepared as follows: a mixture of 100 parts by weight of phenol and 73 parts by weight formalin (37 percent), adjusted with oxalic acid to a pH of 1.0–1.1 was vacuum refluxed in a still at 90° C. to cloudiness. The temperature of the mixture was gradually increased to 120° C. by the steady application of pressure and reflux was continued for two hours at 120° C. At the end of this two hour period, pressure was released and the system was dehydrated until the residue temperature reached 160° C. The resin so produced was discharged into a pan and air cooled to room temperature, about 23° C. The resin was hard, grindable and had a melting point of 105° C.–110° C.

Example 7 was repeated using as the sole curing agent a stoichiometric amount of the novolac resin. This composition was so brittle that it could not be subjected to any of the tests previously noted.

Example 8

The composition, whose formulation is noted below, was formulated and cast into bars in a manner identical to that described in Example 1. The bars so cast were subjected to the following heating cycle: 20 hours at 90° C. and then 6 hours at 160° C.

|  | Composition N |
|---|---|
| Bis-(2,3-epoxycyclopentyl)ether | 100 |
| Hardener | 61 |
| Di-(3-aminopropyl)ether of poly(propylene glycol) | 34 |
| Tensile strength p.s.i. | 4635 |
| Percent elongation | 7.1 |
| Hardness: |  |
| As prepared (Shore D) | 79 |
| Tested after being kept at 125° C. for one week (Shore D) | 80 |

The hardener noted was the same as used in Example 1 and was present in Composition N in an amount of 90 percent of stoichiometric.

Di-(3-aminopropyl)ether of poly(propylene glycol) was present in Composition N in an amount of 10 percent of stoichiometric.

Example 9

The composition, whose formulation is noted below, was formulated and cast into bars in a manner identical to that described in Example 1. The bars so cast were subjected to the following heating cycle: 2 hours at 100° C. and then 2 hours at 150° C.

|  | Composition O |
|---|---|
| Diglycidylether of 2,2-bis-(p-hydroxyphenyl)propane | 100 |
| 1-hydroxy-2-aminoethane | 12 |
| Di-(3-aminopropyl)ether of poly(propylene glycol) | 88 |
| Tensile strenth p.s.i. | 1088 |
| Percent elongation | 265 |

1-hydroxy-2-aminoethane was present in Composition O in an amount of 73 percent of stoichiometric.

Di-(3-aminopropyl)ether of poly(propylene glycol) was present in Composition O in an amount of 27 percent of stoichiometric.

Example 10

A composition of 100 parts by weight of diglycidyl ether of 2,2-bis-(p-hydroxyphenyl)propane (described in Example 1) and 95 parts by weight of a mixture made up of: 74 parts by weight of N-hydroxyethyl diethylene triamine, 31 parts by weight of 1-hydroxy-2-aminoethane, 50 parts by weight of the glycol polyamine described in Example 1 and 184 parts by weight of 2-ethylhexylacrylate, were admixed at 98° C. to a homogeneous blend and then poured between a television picture tube and a glass implosion shield which were mounted in a jig. The composition was then cured to an infusible product, bonding the implosion shield to the television picture tube, by heating the composition at 98° C. for ½ hour.

In order to further illustrate the excellent heat aging properties of the compositions of this invention, the television picture tube to which was bonded the implosion shield by means of the composition described in the preceding paragraph was heat-aged according to the following cycle: 200 hours at 155° C. and then 40 hours at 170° C. At the end of this time, the implosion shield was still strongly bonded to the television picture tube.

In order to demonstrate that the compositions of this invention also serve as protective coatings, the television picture tube, to which was bonded the implosion shield, was deliberately imploded. The implosion shield did not shatter.

Example 11

Compositions were formulated in a manner as described in Example 1, using the same materials and the same equivalent amount of materials, with the exception that, in lieu of the $\alpha,\omega$-di-(3-aminopropyl)ether of poly(1,2-propylene glycol), the following glycol polyamines were used:

Composition P—$\alpha,\omega$-di-(3 - aminopropyl)ether of poly-(1,2-propylene glycol) having an average molecular weight of about 1025.

Composition Q—$\alpha,\omega$-di-(3 - aminopropyl)ether of poly-(ethylene glycol) having an average molecular weight of about 1600.

Composition R—$\alpha,\omega$-di-(3 - aminopropyl)ether of poly-(diethylene glycol) having an average molecular weight of about 3000.

Composition S—$\alpha,\omega$-di-(3 - aminopropyl)ether of poly-(1,2-propylene glycol) having an average molecular weight of about 2025.

Composition T—$\alpha,\omega$-di-(3 - aminopropyl)ether of poly-(1,6-hexylene glycol) having an average molecular weight of about 6112.

Composition U—$\alpha,\omega$-di-(3 - aminopropyl)ether of poly-(1,2-propylene glycol) having an average molecular weight of about 2400.

The compositions noted in this example have properties comparable to those of compositions of Example 1.

What is claimed is:

1. A curable composition comprising a polyepoxide having an epoxy equivalency of greater than one and a glycol polyamine of the formula:

$$H_2N(CH_2)_3-O(C_nH_{2n}O)_x(CH_2)_3NH_2$$

wherein $n$ is an integer having a value of 2 to 10 inclusive and $x$ is an integer having a value of 12 to 100 inclusive, said glycol polyamine being present in said composition in an amount sufficient to cure said composition to an infusible product.

2. The cured product of the composition defined in claim 1.

3. A curable composition comprising a polyepoxide having an epoxy equivalency of greater than one and a glycol polyamine of the formula:

$$H_2N(CH_2)_3-O(C_nH_{2n}O)_x(CH_2)_3NH_2$$

wherein $n$ is an integer having a value of 2 to 10 inclusive and $x$ is an integer having a value of 12 to 100 inclusive, said glycol polyamine being present in said composition in an amount of from about 75 percent of stoichiometric to about 15 percent in excess of stoichiometric.

4. The cured product of the composition defined in claim 3.

5. A curable composition as defined in claim 3 wherein the polyepoxide is diglycidyl ether of 2,2-bis(p-hydroxyphenyl)propane.

6. The cured product of the composition defined in claim 5.

7. A curable composition as defined in claim 3 wherein the polyepoxide is bis(2,3-epoxycyclopentyl)ether.

8. The cured product of the composition defined in claim 7.

9. A curable composition as defined in claim 3 wherein the glycol polyamine is di-(3-aminopropyl)ether of poly-(propylene glycol) of the formula:

$$H_2N-(CH_2)_3-O-(CH_2-\overset{CH_3}{\underset{|}{CH}}-O)_{35}-(CH_2)_3-NH_2$$

10. The cured product of the composition defined in claim 9.

11. A curable composition comprising a polyepoxide having an epoxy equivalency of greater than one and a glycol polyamine of the formula:

$$H_2N(CH_2)_3O(C_nH_{2n}O)_x(CH_2)_3NH_2$$

wherein $n$ is an integer having a value of 2 to 5 inclusive and $x$ is an integer having a value of 15 to 60 inclusive, said glycol polyamine being present in said composition in an amount of from about 75 percent of stoichiometric to about 15 percent in excess of stoichiometric.

12. A curable composition as defined in claim 11 wherein said glycol polyamine is present in said composition in about a stoichiometric amount.

13. A curable composition comprising a polyglycidyl ether of a bis-(hydroxyphenyl)alkane and a glycol polyamine of the formula:

$$H_2N(CH_2)_3-O(C_nH_{2n}O)_x(CH_2)_3NH_2$$

wherein $n$ is an integer having a value of 2 to 10 inclusive and $x$ is an integer having a value of 12 to 100 inclusive, said glycol polyamine being present in said composition in about a stoichiometric amount.

14. A curable composition comprising a polyglycidyl ether of a bis-(hydroxyphenyl)alkane and a glycol polyamine of the formula:

$$H_2N(CH_2)_3-O(C_nH_{2n}O)_x(CH_2)_3NH_2$$

wherein $n$ is an integer having a value of 2 to 5 inclusive and $x$ is an integer having a value of 15 to 60 inclusive, said glycol polyamine being present in said composition in about a stoichiometric amount.

15. A curable composition as defined in claim 3 wherein said glycol polyamine is $\alpha,\omega$-di-(3-aminopropyl)ether of poly(1,2-propylene glycol) having an average molecular weight of about 1025.

16. A curable composition as defined in claim 3 wherein said glycol polyamine is $\alpha,\omega$-di-(3-aminopropyl)-ether of poly(ethylene glycol) having an average molecular weight of about 1600.

17. A curable composition as defined in claim 3 wherein said glycol polyamine is $\alpha,\omega$-di-(3-aminopropyl)-ether of poly(diethylene glycol) having an average molecular weight of about 3000.

18. A curable polyepoxide composition as defined in claim 3 wherein said glycol polyamine is $\alpha,\omega$-di-(3-aminopropyl)ether of poly(1,2-propylene glycol) having an average molecular weight of about 2025.

19. A curable polyepoxide composition as defined in claim 3 wherein said glycol polyamine is α,ω-di-(3-aminopropyl)ether of poly(1,6-hexylene glycol) having an average molecular weight of about 6112.

20. A curable polyepoxide composition as defined in claim 3 wherein said glycol polyamine is α,ω-di-(3-aminopropyl)ether of poly(1,2-propylene glycol) having an average molecular weight of about 2400.

21. A curable composition comprising a polyepoxide having an epoxy equivalency of greater than one, a hardener for said polyepoxide, and a glycol polyamine of the formula:

$$H_2N(CH_2)_3\!-\!O\!\!\left(C_nH_{2n}O\right)_{\!x}\!(CH_2)_3NH_2$$

wherein $n$ is an integer having a value of 2 to 10 inclusive and $x$ is an integer having a value of 12 to 100 inclusive, the total amount of said glycol polyamine and said hardener present in said composition being from about 75 percent of stoichiometric to about 15 percent in excess of stoichiometric with the said glycol polyamine being present in at least about 5 percent of stoichiometric.

22. A curable composition as defined in claim 21 wherein the total amount of said glycol polyamine and said hardener present in said composition is about a stoichiometric amount.

23. A curable composition as defined in claim 21 wherein the hardener is a mixture of m-phenylenediamine, 4,4′-methylene dianiline and diglycidyl ether of 2,2-bis-(p-hydroxyphenyl)propane.

24. A curable composition as defined in claim 21 wherein the hardener is m-phenylenediamine.

25. A curable composition as defined in claim 21 wherein the hardener is 4,4′-methylenedianiline.

26. A curable composition as defined in claim 21 wherein the hardener is hexahydrophthalic anhydride.

27. A curable composition as defined in claim 21 wherein the hardener is methyl-bicyclo(2,2,1) hept-5-ene-2,3-dicarboxylic anhydride.

28. A curable composition as defined in claim 21 wherein the hardener is an acid catalyzed phenol-formaldehyde condensate.

29. A curable composition as defined in claim 21 wherein the hardener is ethanolamine.

30. A curable composition as defined in claim 21 wherein the hardener is a glycol diamine of the formula:

$$H_2N(CH_3)_2\!-\!O\!\!\left(CH_2CH_2\!-\!O\right)_{\!2}\!(CH_3)_2NH_2$$

31. A curable composition comprising a polyepoxide having an epoxy equivalency of greater than one, a hardener of the formula:

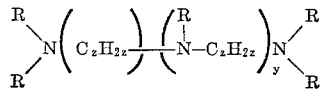

wherein $y$ has a value of 0 to 3 inclusive, $z$ has a value of 2 to 6 inclusive and each R is selected from the group consisting of hydrogen and hydroxyalkyl with the further limitation that the number of instances per molecule where R represents hydroxyalkyl being a whole number which is at least one but less than $y+2$, and a glycol polyamine of the formula:

$$H_2N(CH_2)_3\!-\!O\!\!\left(C_nH_{2n}O\right)_{\!x}\!(CH_2)_3NH_2$$

wherein $n$ is an integer having a value of 2 to 5 inclusive and $x$ is an integer having a value of 15 to 60 inclusive, the total amount of said glycol polyamine and said hardener present in said composition being from about 75 percent of stoichiometric to about 15 percent in excess of stoichiometric with the said glycol polyamine being present in at least about 5 percent of stoichiometric.

32. A composition as defined in claim 21 wherein the said polyepoxide is a polyglycidyl ether of a bis-(hydroxyphenyl)alkane.

33. A laminate comprising 2 layers of glass bonded together by the cured product of the composition defined in claim 3.

References Cited

UNITED STATES PATENTS 2,982,751  5/1961  Anthes _____ 260—2
2,935,488  5/1960  Phillips et al. _____ 260—47

WILLIAM H. SHORT, *Primary Examiner.*

T. E. PERTILLA, *Assistant Examiner.*